(12) United States Patent
Gonsalves et al.

(10) Patent No.: US 8,855,698 B2
(45) Date of Patent: Oct. 7, 2014

(54) METHOD AND APPARATUS FOR DYNAMICALLY ADDING PARTICIPANTS INTO AN EXISTING TALK GROUP

(75) Inventors: Mark Conrad Gonsalves, Morris, IL (US); Douglas J. Hall, Westerville, OH (US)

(73) Assignee: Cisco Technology, Inc., San Jose, CA (US)

( * ) Notice: Subject to any disclaimer, the term of this patent is extended or adjusted under 35 U.S.C. 154(b) by 935 days.

(21) Appl. No.: 12/821,440

(22) Filed: Jun. 23, 2010

(65) Prior Publication Data

US 2011/0319117 A1   Dec. 29, 2011

(51) Int. Cl.
*H04B 7/00* (2006.01)
*H04W 76/02* (2009.01)
*H04W 4/00* (2009.01)
*H04L 12/18* (2006.01)

(52) U.S. Cl.
CPC .............. *H04W 4/001* (2013.01); *H04W 76/02* (2013.01); *H04L 12/1822* (2013.01)
USPC ............................ 455/519; 455/517; 455/518

(58) Field of Classification Search
CPC ..... H04H 60/33; H04W 84/00; H04W 76/02; H04W 4/001; H04B 7/00; H04L 12/1822
USPC ................................................ 455/517–519
See application file for complete search history.

(56) References Cited

U.S. PATENT DOCUMENTS

| | | | | |
|---|---|---|---|---|
| 5,953,400 | A * | 9/1999 | Rosenthal et al. | 379/202.01 |
| 7,415,284 | B2 * | 8/2008 | Hoover et al. | 455/518 |
| 7,633,914 | B2 * | 12/2009 | Shaffer et al. | 370/338 |
| 7,636,339 | B2 * | 12/2009 | Shaffer et al. | 370/338 |
| 8,230,010 | B1 * | 7/2012 | Hardjono et al. | 709/204 |
| 8,260,338 | B2 * | 9/2012 | Shaffer et al. | 455/518 |
| 2006/0046761 | A1 * | 3/2006 | Bishop et al. | 455/519 |
| 2007/0036100 | A1 * | 2/2007 | Shaffer et al. | 370/328 |
| 2007/0202908 | A1 * | 8/2007 | Shaffer et al. | 455/518 |
| 2008/0051124 | A1 * | 2/2008 | Shaffer et al. | 455/518 |
| 2008/0096600 | A1 * | 4/2008 | Siegel | 455/519 |
| 2008/0109470 | A1 * | 5/2008 | McGee | 707/102 |
| 2008/0212771 | A1 * | 9/2008 | Hauser | 380/44 |
| 2009/0106416 | A1 * | 4/2009 | Cohen et al. | 709/224 |
| 2010/0150021 | A1 * | 6/2010 | Khasnabish | 370/254 |
| 2010/0317392 | A1 * | 12/2010 | Davis et al. | 455/518 |
| 2011/0010282 | A1 * | 1/2011 | Olin et al. | 705/34 |
| 2012/0210131 | A1 * | 8/2012 | Knowles et al. | 713/168 |

* cited by examiner

*Primary Examiner* — Bobbak Safaipour
(74) *Attorney, Agent, or Firm* — P. Su

(57) ABSTRACT

In one embodiment, a method includes initiating a dynamic group call, detecting a call alert, and identifying a user system responsible for the call alert. The dynamic group call includes at least one original participant, and is initiated such that an ability to automatically add at least one new participant to the dynamic group call is enabled. Identifying the user system includes obtaining an indicator from the call alert. The indicator is associated with the user system. Finally, the method includes automatically adding the user system to the dynamic group call.

24 Claims, 7 Drawing Sheets

METHOD AND APPARATUS FOR DYNAMICALLY ADDING PARTICIPANTS INTO AN EXISTING TALK GROUP

BACKGROUND

The disclosure relates generally to conferencing systems, and more particularly to interoperability and collaboration systems which support group calls.

Communication networks, e.g., radio communications networks, often allow for the creation of communication groups or talk groups. A communication group may generally be created using identifiers associated with communication devices, e.g., radio communication devices.

Often, in a communication network such as an Internet Protocol (IP) interoperability and collaboration system (IPICS) system, participants may be added into a talk group by an operator of the IPICS system. After a talk group is created, additional participants may be manually added into the talk group by the operator of the IPICS system. An additional participant who wishes to participate in an existing talk group will typically have to determine how to communicate with the operator of the IPICS system, and, upon determining how to communicate with the operator of the IPICS system, will have to request to be added to the existing talk group. Determining how to communicate with the operator may be inconvenient. In addition, waiting for the operator of the IPICS system to respond to a request to be added to the existing talk group may take a significant amount of time and be disruptive to the operator.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

According to one aspect, a method includes initiating a dynamic group call, detecting a call alert, and identifying a user system responsible for the call alert. The dynamic group call includes at least one original participant, and is initiated such that an ability to automatically add at least one new participant to the dynamic group call is enabled. Identifying the user system includes obtaining an indicator from the call alert. The indicator is associated with the user system. Finally, the method includes automatically adding the user system to the dynamic group call.

Description

Within a communication system such as an Internet Protocol Interoperability and Collaboration System (IPICS) system, Radio Control Service (RCS) functionality may initiate and maintain talk groups that include any number communication devices. A talk group may be associated with a location at which an emergency has occurred, and may allow communication devices, as for example radio communication devices, at the location to communicate with each other in an expedient manner. New communication devices may be added to an established talk group using the RCS functionality.

In one embodiment, new communication devices may be automatically added to an established talk group, e.g., a dynamic group call, when call alerts are obtained from the new communication devices. By allowing new communication devices to be automatically added to an established talk group, an operator of an IPICS system may substantially avoid the relatively time-consuming process of manually adding the new communication devices to the established talk group. Further, automatically adding the new communication devices to the established talk group allows the new communication devices to participate in the established talk group substantially without significant delay once participation in the established talk group is requested.

When an IPICS system notifies an RCS to start a talk group, the IPICS system generally provides a managed list, e.g., of device identifiers (IDs), to the RCS. The managed list is arranged to identify communication devices that are to be invited to participate in, or otherwise join, the talk group. In addition to providing the managed list, the IPICS system may notify the RCS that the talk group is to be arranged to allow additional communications devices, e.g., communications devices not identified in the managed list, to be dynamically added to the talk group at substantially any time. Hence, when the RCS initiates a talk group, the talk group is configured to process a call alert, e.g., a request, received from a new communication device to join the talk group by automatically adding that new communication device to the talk group, in one embodiment.

Figure 1:
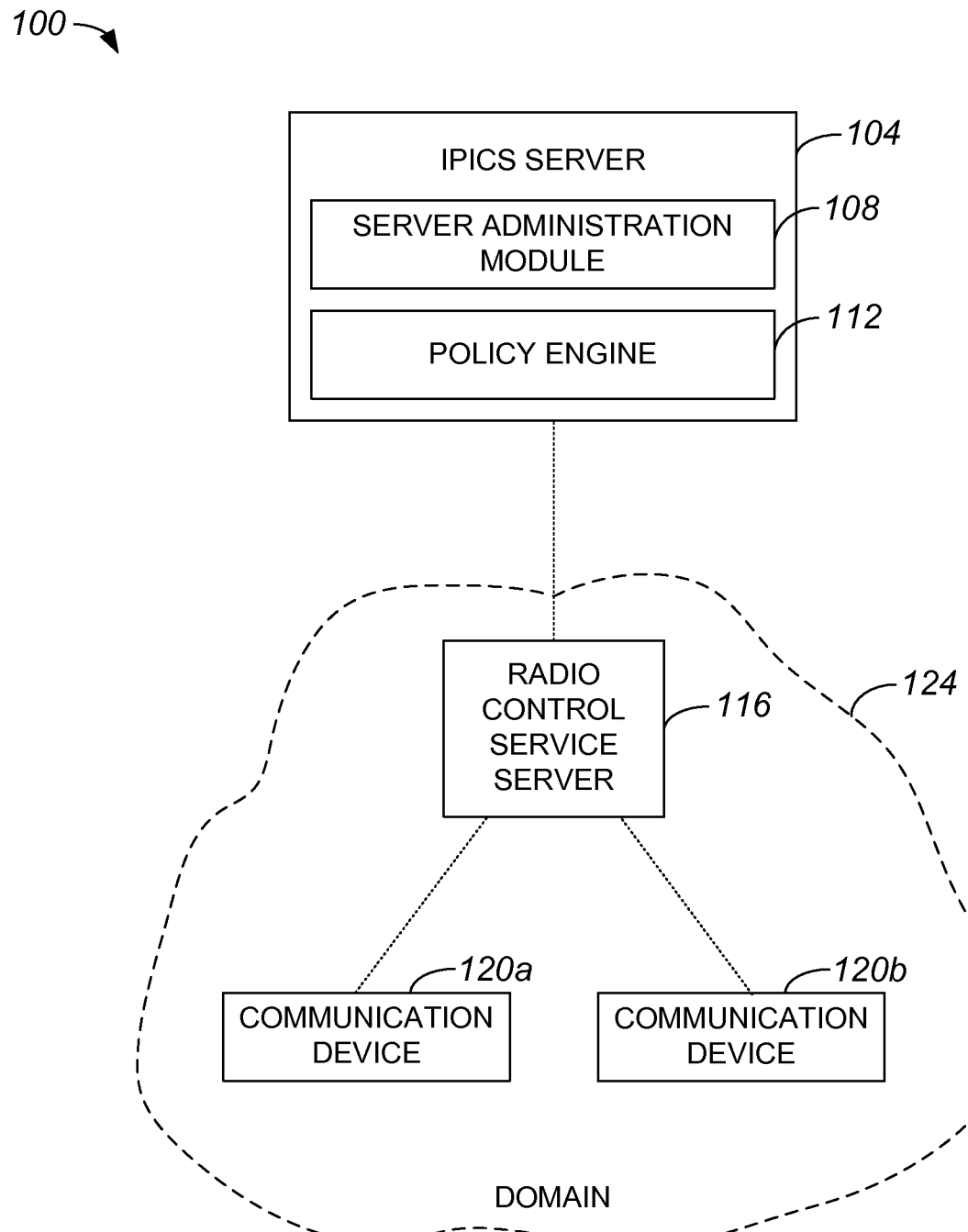
FIG. 1 is a diagrammatic representation of an overall interoperability and collaboration system that includes a radio control service server.

Referring initially to FIG. 1, an overall interoperability and collaboration system, e.g., an overall IPICS system, that includes an RCS provided on a server will be described. An overall IPICS system 100 includes an IPICS server 104 and an RCS server 116. IPICS server 104 includes a server administration module 108 and a policy engine 112. Server administration module 108 generally provides an interface that allows an administrator of IPICS server 104 to manage resources within overall IPICS system 100. Policy engine 112 is arranged to include policies related to the establishment of talk groups, and may include an interface through which an administrator of IPICS server 104 may configure policies. In one embodiment, policy engine 112 may include a policy that enables a talk group or a dynamic group call to allow new participants to be automatically.

RCS server 116, or a server that is configured to run an instance of RCS, is arranged to support a domain 124.

Domain 124 may be, in one embodiment, a physical location or a wireless network, Within domain 124, communication devices 120a, 120b may participate in a talk group or a dynamic group call that is established by RCS server 116. Although two communication devices 120a, 120b are shown, the number of communication devices in a talk group established by RCS server 116 may vary widely. It should be appreciated that RCS server 116 may use information provided by IPICS server 104, e.g., policy information from policy engine 112, when establishing a talk group or dynamic group call.

Figure 2:
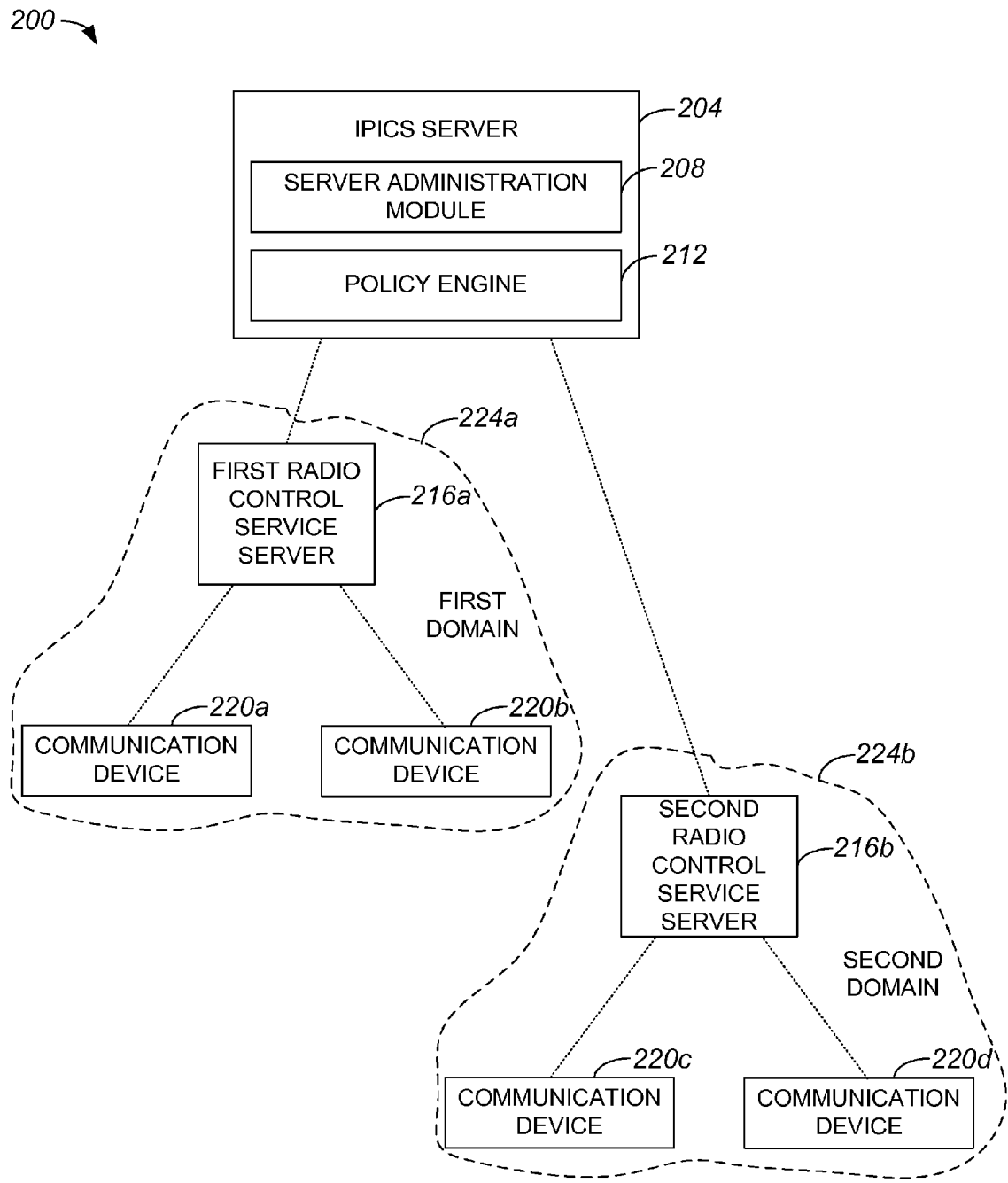
FIG. 2 is a diagrammatic representation of an overall interoperability and collaboration system that includes a plurality of radio control service servers.

In general, an overall IPICS system may include more than one domain and, thus, more than one RCS server. That is, RCS functionality may be distributed across multiple servers within an overall IPICS system. For example, an overall IPICS system that includes multiple domains may include separate RCS servers that are arranged to support each of the domains. FIG. 2 is a diagrammatic representation of an overall IPICS system that includes a plurality of RCS servers. An overall IPICS system 200 includes an IPICS server 204, and RCS servers 216a, 216b. IPICS server 204 includes a server administration module 208 and a policy engine 212. A first RCS server 216a is arranged to support a first domain 224a, and a second RCS server 216b is arranged to support a second domain 224b.

Within first domain 224a, communication devices 220a, 220b may participate in a talk group or a dynamic group call that is established by RCS server 216a. Similarly, within second domain 224b, communication devices 220c, 220d may participate in a talk group or a dynamic group call that is established by RCS server 216b.

Figure 3:
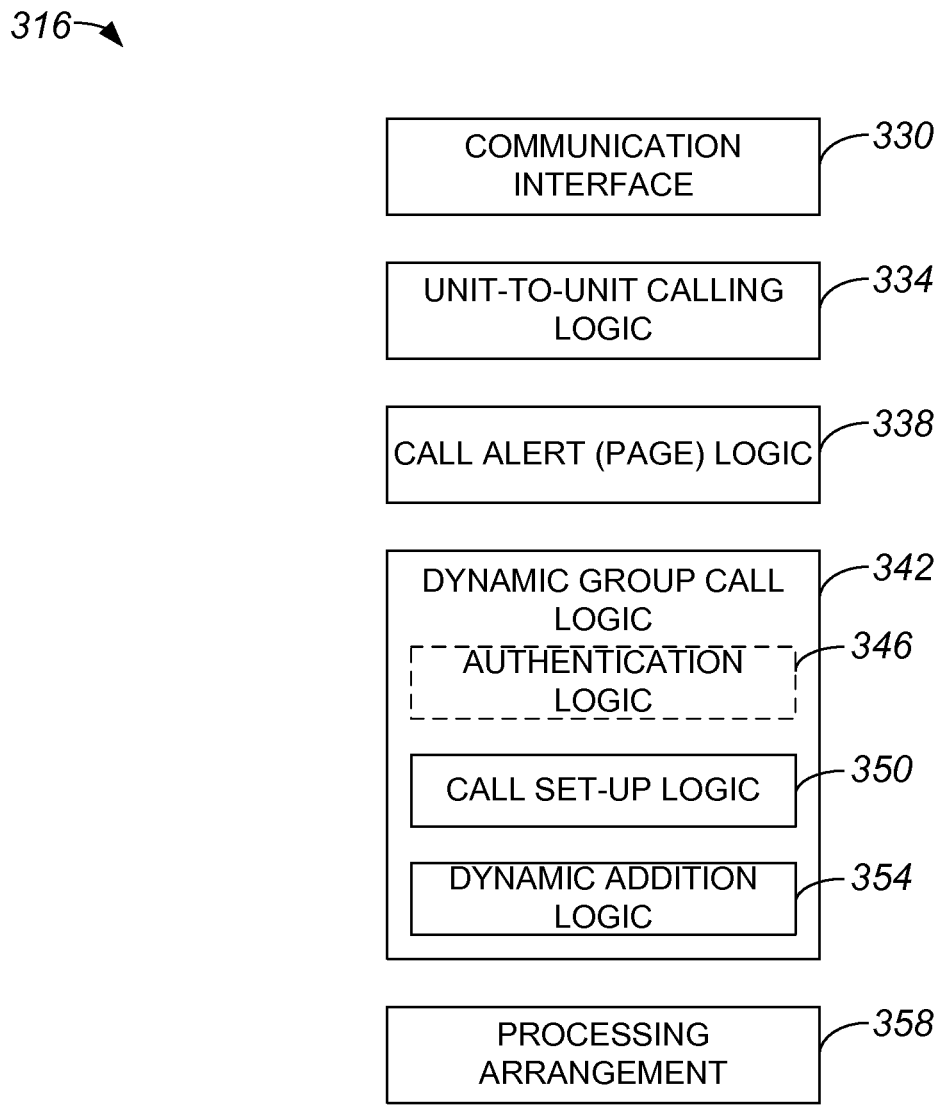
FIG. 3 is a block diagram representation of a server which provides a radio control service (RCS) within an interoperability and collaboration system in accordance with an embodiment.

In general, an RCS server may provide serial radio control, and may support unit-to-unit calling and dynamic group calls. An RCS server is also generally responsible for substantially configuring participants in a dynamic group call for interoperability. With reference to FIG. 3, one embodiment of an RCS server will be described. An RCS server 316 generally includes logic, e.g., hardware and/or software logic, that is configured to provide RCS functionality. A processing arrangement 358 is arranged to execute software logic associated with RCS server 316.

A communication interface 330 that is part of RCS server 316 is arranged to allow RCS server 316 to communicate within an overall IPICS system. For example, communication interface 330 is typically configured to allow RCS server 316 to communicate with at least an IPICS server (not shown) and communication devices (not shown) such as radio communication devices. In general, communication interface 330 may include a radio interface which allows radio communications to occur between radio communication devices (not shown) and RCS server 316, as for example when RCS server 316 calls radio communication devices to add the radio communication devices to a talk group or dynamic group call.

RCS server 316 also includes unit-to-unit calling logic 334 and call alert, or page, logic 338. Unit-to-unit calling logic allows units (not shown), e.g., communication devices, to communicate with each other through RCS server 316. Call alert logic 338 is arranged to enable RCS server 316 to detect or to otherwise obtain information from a communication device (not shown) that is requesting inclusion in a talk group or a dynamic group call. By way of example, call alert logic 338 may detect an incoming call alert from a radio communication device (not shown) that is attempting to gain entrance to a talk group or a dynamic group call. In one embodiment, the incoming call alert may identify a direct connect number of the radio communication device (not shown) that may be called using communication interface 330.

Dynamic group call logic 342 is generally arranged to initiate a talk group or a dynamic group call, and includes call set-up logic 350 and dynamic addition logic 354. Call set-up logic 350 may use instructions provided by an IPICS server (not shown) to initiate or otherwise set-up a talk group or dynamic group call. For example, call set-up logic 350 may obtain a managed list of communication devices (not shown) to include in a dynamic group call, as well as instructions to enable communication devices that are not on the managed list to participate in the dynamic group call, from an IPICS server (not shown). Call set-up logic 350 may also configure communication devices (not shown) for proper interoperability. Dynamic addition logic 354 allows new participants (not shown), e.g., communication devices that are not identified on a managed list associated with a dynamic group call, to be automatically added to an established dynamic group call. In one embodiment, a new participant (not shown) may be added to an established dynamic group call substantially automatically in response to a call alert obtained from the new participant.

Dynamic group call logic 342 may optionally include authentication logic 346. Authentication logic 346 may authenticate a new participant (not shown) before allowing the new participant to be automatically added to an established dynamic group call. For example, authentication logic 346 may check a user identifier or direct connect number of a new participant (not shown) against a list of blocked or otherwise prohibited user identifiers or direct connect numbers to ascertain whether the new participant is authorized to join the established dynamic group call.

Figure 4:
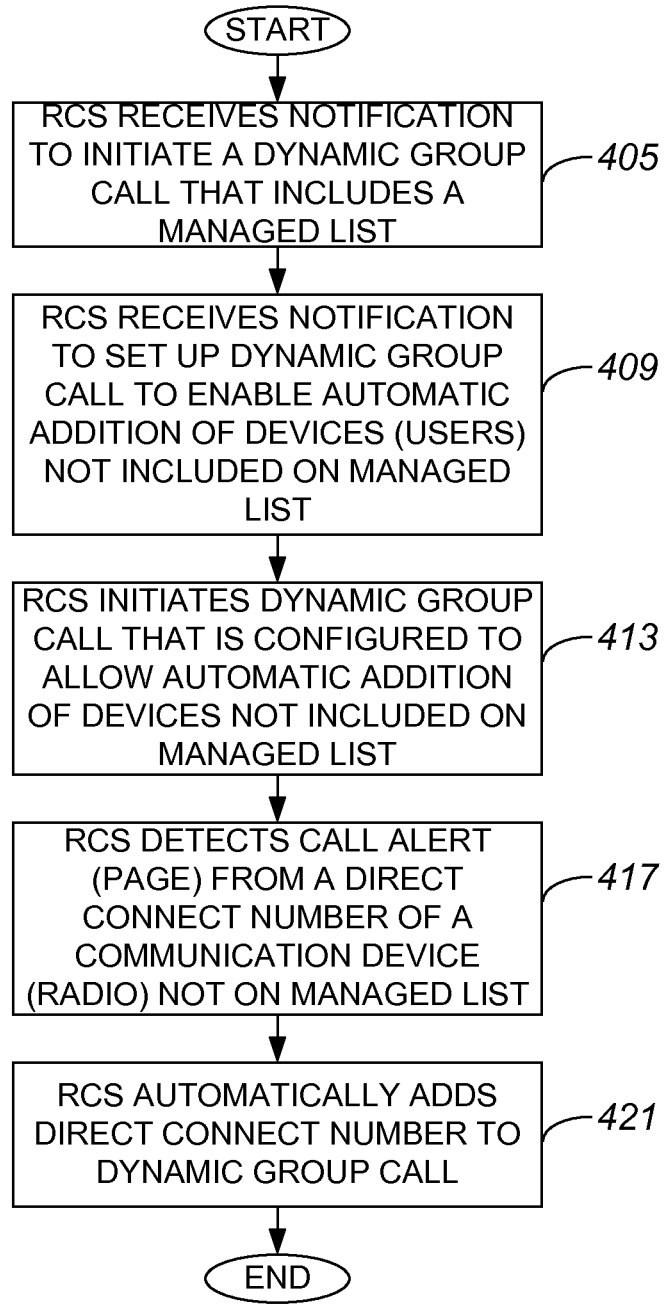
FIG. 4 is a process flow diagram which illustrates a method of operating an RCS server that automatically adds a new participant to a dynamic group call substantially without authenticating the new participant in accordance with an embodiment.

FIG. 4 is a process flow diagram which illustrates a method of operating an RCS server that automatically adds a new participant to an established dynamic group call substantially without authenticating the new participant in accordance with an embodiment. A method 401 of operating an RCS begins at step 405 in which the RCS receives or, more generally, obtains a notification to initiate a dynamic group call. The notification may be obtained from an associated IPICS server, and may include a managed list that identifies participants in the dynamic group call.

Once the notification is obtained, the RCS receives or otherwise obtains a notification in step 409 to set up the dynamic group call to enable the automatic addition of communication devices, e.g., communication devices included in user systems, that are not identified on the managed list. It should be appreciated that the notification of step 409 may be included in the notification received in step 405.

After the RCS obtains notification to set up a dynamic group call to enable the automatic addition of communication devices, the RCS initiates a dynamic group call in step 413. Initiating the dynamic group call includes effectively creating the dynamic group call with a group of participants identified in the managed list.

In step 417, substantially while the dynamic group call is in progress, the RCS detects a call alert or a page from a communication device that is not identified on the managed list. Detecting a call alert may include identifying a direct connect number of a communication device that is not identified on the managed list. In one embodiment, the direct connect number or, more generally an indicator that identifies the communication device, may be included in the call alert. It should be appreciated that the RCS may identify the call alert as being a request by the communication device to be admitted to the dynamic group call.

The RCS automatically adds the direct connect number of the communication device that is not identified on the managed list to the dynamic group call in step 421. Once the direct connect number of the communication device that is not identified on the managed list is added to the dynamic group call, the communication device may participate in the dynamic group call, and the process of operating an RCS is completed.

Figure 5:
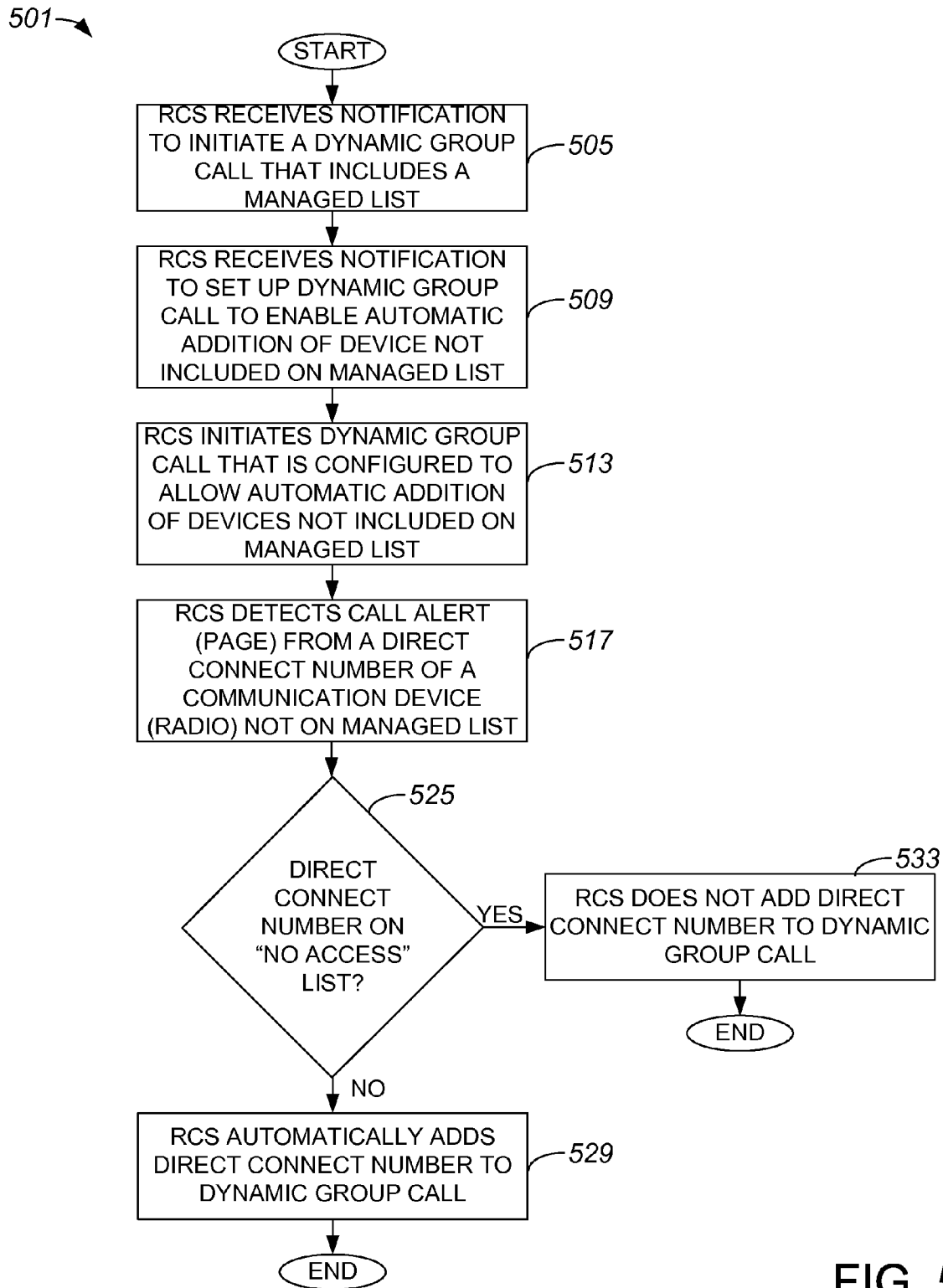
FIG. 5 is a process flow diagram which illustrates a method of operating an RCS server that automatically authenticates and adds a new participant to a dynamic group call, if appropriate, in accordance with an embodiment.

As mentioned above, an RCS may authenticate a new participant, e.g., a communication device that is not identified on a managed list associated with a dynamic group call, prior to automatically adding the new participant into the dynamic group call. FIG. 5 is a process flow diagram which illustrates a method of operating an RCS server that automatically authenticates and adds a new participant to a dynamic group call, if appropriate, in accordance with an embodiment. A method 501 of operating an RCS begins at step 505 in which the RCS receives or otherwise obtains a notification to initiate a dynamic group call. The notification may be obtained from an associated IPICS server, and may include a managed list that identifies participants in the dynamic group call.

The RCS receives or otherwise obtains a notification in step 509 to set up the dynamic group call such that the automatic addition of communication devices, e.g., communication devices included in user systems, that are not identified on the managed list is enabled. It should be appreciated that the notification of step 509 may be included in the notification received in step 505.

After the RCS obtains notification to set up a dynamic group call to enable the automatic addition of communication devices, the RCS initiates a dynamic group call in step 513. Initiating the dynamic group call includes effectively creating the dynamic group call that includes a group of participants identified in the managed list.

Once the dynamic group call is initiated, the RCS detects a call alert or a page in step 517 from a communication device that is not identified on the managed list. Detecting a call alert may include identifying a direct connect number of a communication device that is not identified on the managed list.

From step 517, process flow proceeds to step 525 in which it is determined whether the direct connect number identified in step 517 is identified on a "no access" list. That is, it is determined whether the direct connect number is authorized to participate in the dynamic group call. It should be appreciated that in lieu of determining whether the direct connect number of a communication device is on a "no access" or blocked list, other information that identifies the communication device may be used to determine whether the communication device is on the "no access" list.

If the determination in step 525 is that the direct connect number is not on a "no access" list, the indication is that the communication device with the direct contact number identified in step 517 may participate in the dynamic group call. As such, process flow moves from step 525 to step 529 in which the RCS automatically adds the direct connect number of the communication device to the dynamic group call. Once the direct connect number is added to the dynamic group call, the communication device may participate in the dynamic group call, and the process of operating an RCS is completed.

Alternatively, if the determination in step 525 is that the direct connect number is on the "no access" list, the implication is that the communication device is essentially blocked from joining the dynamic group call. Accordingly, in step 533 the RCS does not add the direct connect number to the dynamic group call, and the process of operating an RCS is completed. It should be appreciated that although the RCS does not automatically add the direct connect number of the communication device to the dynamic call group, the communication device may attempt other methods to join the dynamic group call, e.g., the communication device may contact an appropriate operator to request a manual addition to the dynamic group call.

Figure 6:
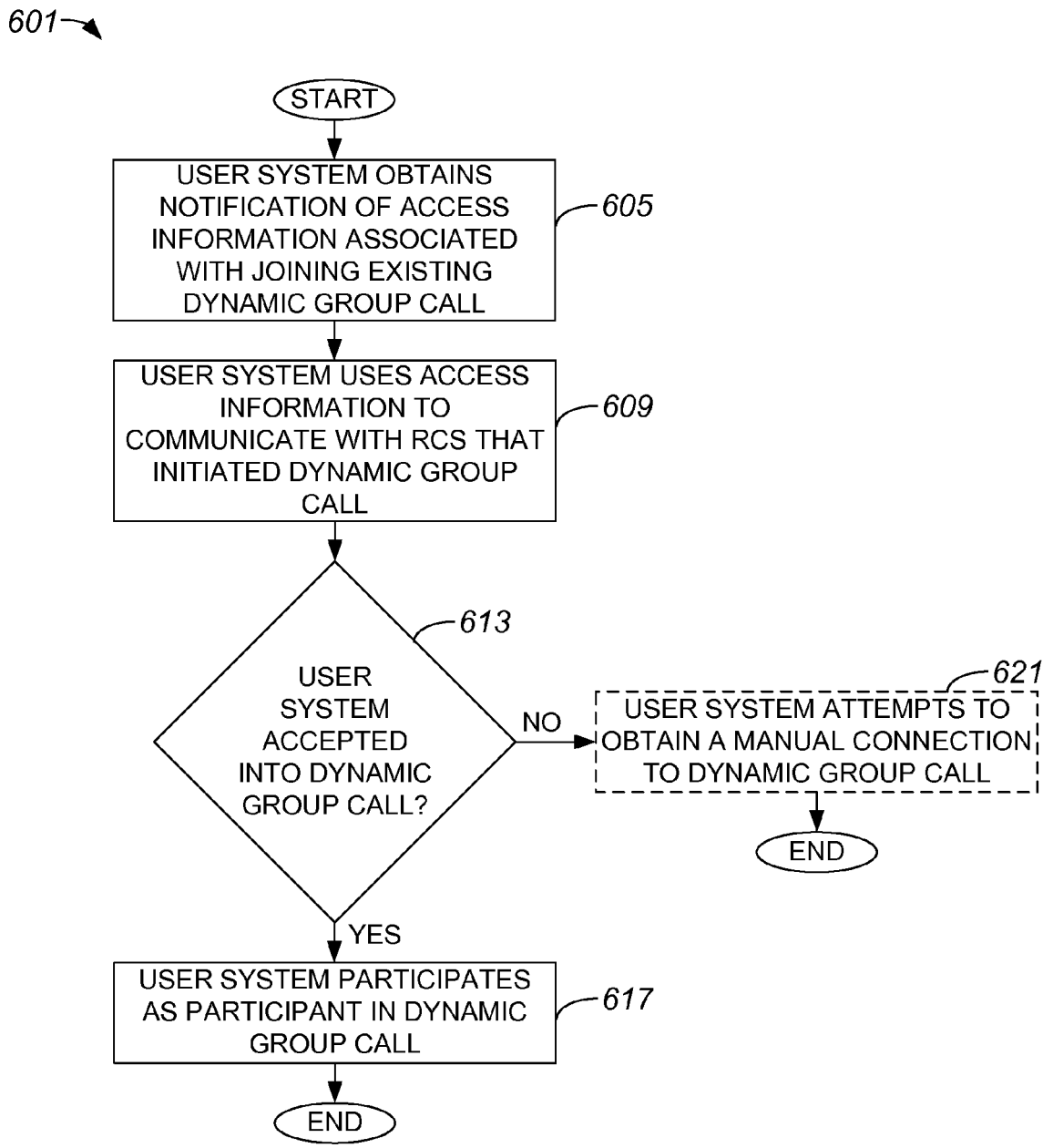
FIG. 6 is a process flow diagram which illustrates a process undertaken by a user system, or a new participant, that intends to join a dynamic group call in accordance with an embodiment.

With reference to FIG. 6, a process undertaken by a communication device, e.g., a communication device included in a user system, in an effort to join a dynamic group call in accordance with an embodiment. A process 601 of operating a user system begins at step 605 in which the user system obtains a notification relating to access information that may be used to join an existing dynamic group call. For example, the user system may essentially obtain access information that may be used to page an RCS that initiated the existing dynamic group call. In the described embodiment, a user system may include a human user and a communication device such as a radio communication device. The user system may obtain a notification from any suitable source. For example, the access information used to page an RCS may be obtained by a human user from a visual source such as a document, may be obtained by a human user from an audible source such as a broadcasted announcement, and/or may be obtained by a communication device as a message provided by an RCS or an associated IPICS server.

Once the user system obtains notification of access information, the user system uses the access information to communicate with the RCS in step 609. For example, the user system may use the access information to page the RCS, or to otherwise alert the RCS that the user system is requesting access to the dynamic group call.

After the user system communicates with the RCS, a determination is made in step 613 as to whether the user system has been accepted into, or granted access to, the dynamic group call. Such a determination may include, but is not limited to including, determining whether the RCS has notified the user system of acceptance into the dynamic group call. If it is determined that the user system has been accepted into the dynamic group call, then the user system participates as a participant in the dynamic group call in step 617, and the process of operating a user system is completed.

Alternatively, if the determination in step 613 is that the user system has not been accepted into the dynamic group call, the indication may be that the user system did not pass an authentication process. In the described embodiment, if the user system has not been accepted into the dynamic group call, process flow moves from step 613 to an optional step 621 in which the user system may attempt to obtain a manual connection to the dynamic group call. For example, the user system may attempt to contact an operator associated with the RCS to request that the operator add the user system to the dynamic group call. After the user system attempts to obtain a manual connection to the dynamic group call, the process of operating a user system is completed.

Figure 7:
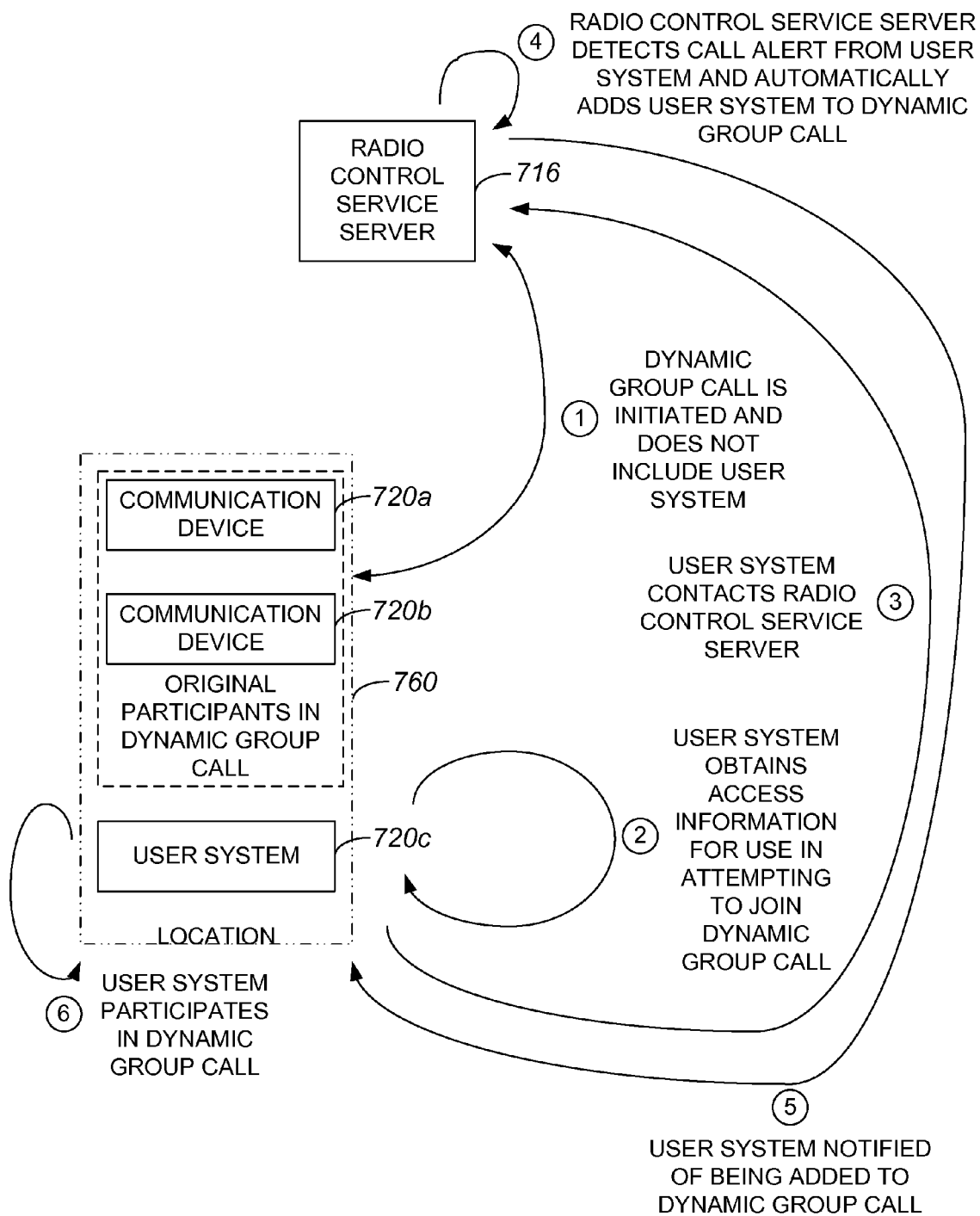
FIG. 7 is a diagrammatic representation of a system in which a user system, or a new participant, automatically joins a dynamic group call that is initiated by an RCS server in accordance with an embodiment.

In general, a user system and an RCS cooperate to automatically add a user system to a talk group or a dynamic group call initiated by the RCS. FIG. 7 is a diagrammatic representation of an overall system in which a user system cooperates with an RCS server to automatically join a dynamic group call in accordance with an embodiment. Initially, as for example at a time t1, there are a plurality of communication devices 720a, 720b at a location 760 that are participants in a dynamic group call initiated by a RCS server 716. Location 760 may be any suitable location, e.g., a physical location or a virtual location.

At a time t2, a user system 720c at location 760 may obtain access information that may be used in attempting to join the dynamic group call. It should be appreciated that the access information may be obtained in a variety of different manners. By way of example, the access information may be substantially advertised at location 760. User system 720c contacts, e.g., sends a call alert or a page to, RCS 716 using the access information at a time t3.

Upon detecting the call alert or page from user system 720c, RCS 716 identifies user system 720c and automatically adds user system 720c to the dynamic group call at a time t4. Automatically adding user system 720c to the dynamic group call may include, in one embodiment, first authenticating user system 720c. After user system 720c is added to the dynamic group call, user system 720c may be notified by RCS 716 at a time t5 that user system 720c has been added to the dynamic group call. Then, at a time t6, user system 720c participates in the dynamic group call, along with communication devices 720a, 720b.

Although only a few embodiments have been described in this disclosure, it should be understood that the disclosure may be embodied in many other specific forms without departing from the spirit or the scope of the present disclosure. By way of example, although the ability for new participants to be automatically added to an existing or ongoing dynamic group call has been described in terms of an IPICS system, such an ability is not limited to being associated with an IPICS system. In general, the ability to add new participants to an existing group call may be implemented with respect to any suitable conference system that is used to support conference calls. Further, a dynamic group call may more generally be a dynamic group communication session.

In one embodiment, a dynamic group call may be established with respect to a particular event. For instance, a dynamic group call may be established with respect to a physical location associated with an emergency to facilitate communications as emergency responders respond to the emergency. As various agencies respond to the emergency, it may be desirable for communication devices associated with the various agencies to join the established dynamic group call. Any suitable method may generally be used to notify the various agencies of an access number to dial, for example, to initiate the process of adding communication devices of the various agencies to the dynamic group call. Suitable methods used to notify various agencies of information needed to join a dynamic group call may include, but are not limited to including, sending the information in electronic messages to communication devices, advertising the information on notices at the location of the emergency, and otherwise announcing the information at the location of the emergency.

User systems and/or communication devices may include any suitable device. In general, a suitable device is substantially any device that supports being dynamically grouped into a group call. Suitable devices may include, but are not limited to including, radio communication devices such as iDEN radios, TETRA radios, and P25 radios. Other suitable devices may include, for example, telephones such as cellular phones and smartphones, as well as computing devices.

The embodiments may be implemented as hardware and/or software logic embodied in a physical, tangible medium that is operable to perform the various methods and processes described above. That is, the logic may be embodied as and/or in physical arrangements, modules, or components. A tangible medium may be substantially any computer-readable medium that is capable of storing logic which may be executed, e.g., by a processor associated with a computing system, to perform methods and functions associated with the embodiments. In other words, logic stored on a computer-readable medium is operable to perform the methods and the functions associated with the embodiments when the logic is executed by a processor. Such computer-readable mediums may include, but are not limited to including, physical storage devices, memory devices, and databases. Executable logic may include code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. For example, while a notification to initiate a dynamic group call has been described as including a managed list, such a notification is not limited to including a managed list. In one embodiment, a dynamic group call may be set up such that substantially all participants in the dynamic group call are user systems or communication devices that joined the dynamic group call after the dynamic group call was initiated. Therefore, the present examples are to be considered as illustrative and not restrictive, and the examples is not to be limited to the details given herein, but may be modified within the scope of the appended claims.

What is claimed is:

1. A method comprising:
    initiating a dynamic group call, the dynamic group call including at least one original participant, wherein the dynamic group call is initiated to enable automatically adding at least one new participant to the dynamic group call;
    detecting a call alert;
    identifying a user system responsible for the call alert, wherein identifying the user system includes obtaining an indicator from the call alert, the indicator being associated with the user system; and
    automatically adding the user system to the dynamic group call.

2. The method of claim 1 further including:
    advertising access information, the access information being arranged to allow the user system to provide the call alert.

3. The method of claim 1 wherein the indicator is a direct connect number, the direct connect number being associated with the user system.

4. The method of claim 3 wherein automatically adding the user to the dynamic group call includes automatically adding the direct connect number to the dynamic group call.

5. The method of claim 1 wherein the user system includes a radio communication device.

6. The method of claim 1 further including:
    authenticating the user system before automatically adding the user system to the dynamic group call.

7. The method of claim 6 wherein authenticating the user system includes determining if the user system is identified as being blocked from joining the dynamic group call.

8. The method of claim 1 further including:
    obtaining a notification to initiate the dynamic group call before initiating the dynamic group call.

9. The method of claim 8 wherein the notification is obtained from an Internet Protocol Interoperability and Collaboration System (IPICS) server, and the notification includes a managed list, the managed list being arranged to identify the at least one participant.

10. A non-transitory computer-readable medium comprising computer program code, the computer program code, when executed, configured to:
- initiate a dynamic group call, the dynamic group call including at least one original participant, wherein the dynamic group call is initiated to enable automatically adding at least one new participant to the dynamic group call;
- detect a call alert;
- identify a user system responsible for the call alert, wherein the computer program code configured to identify the user system includes computer program code configured to obtain an indicator from the call alert, the indicator being associated with the user system; and
- automatically add the user system to the dynamic group call.

11. The non-transitory computer-readable medium of claim 10 further including computer program code configured to:
- advertise access information, the access information being arranged to allow the user system to provide the call alert.

12. The non-transitory computer-readable medium of claim 10 wherein the indicator is a direct connect number, the direct connect number being associated with the user system.

13. The non-transitory computer-readable medium of claim 12 wherein the computer program code configured to automatically add the user to the dynamic group call includes computer program code configured to automatically add the direct connect number to the dynamic group call during the dynamic group call, and wherein the computer program code configured to automatically add the direct connect number to the dynamic group call is configured to cause the user system to participate in the dynamic group call.

14. The non-transitory computer-readable medium of claim 10 wherein the user system includes a radio communication device.

15. The non-transitory computer-readable medium of claim 10 further including computer program code configured to:
- authenticate the user system before automatically adding the user system to the dynamic group call.

16. The non-transitory computer-readable medium of claim 15 wherein the computer program code configured to authenticate the user system includes computer code configured to determine if the user system is identified as being blocked from joining the dynamic group call.

17. The non-transitory computer-readable medium of claim 10 further including computer code configured to:
- receive a notification to initiate the dynamic group call before initiating the dynamic group call.

18. The non-transitory computer-readable medium of claim 17 wherein the notification is received from an Internet Protocol Interoperability and Collaboration System (IPICS) server, and the notification includes a managed list, the managed list being arranged to identify the at least one participant.

19. An apparatus comprising:
- means for initiating a dynamic group call, the dynamic group call including at least one original participant, wherein the dynamic group call is initiated to enable automatically adding at least one new participant to the dynamic group call;
- means for detecting a call alert;
- means for identifying a user system responsible for the call alert, wherein the means for identifying the user system include means for obtaining an indicator from the call alert, the indicator being associated with the user system; and
- means for automatically adding the user system to the dynamic group call.

20. An apparatus comprising:
- dynamic group call logic, the dynamic group call logic being arranged to initiate a dynamic group call including at least one original participant, the dynamic group call logic further being arranged to allow at least one new participant to be automatically added to the dynamic group call after the dynamic group call is initiated;
- call alert logic, the call alert logic being arranged to detect a call alert from a user system, the call alert being arranged to indicate that the user system is requesting access to the dynamic group call, wherein the dynamic group call logic is still further arranged to automatically add the user system to the dynamic group call as the at least one new participant after the call alert from the user system is detected; and
- a processing arrangement, the processing arrangement being arranged to execute the logic.

21. The apparatus of claim 20 wherein the apparatus is a radio control service server of an Internet Protocol Interoperability and Collaboration System (IPICS) system.

22. The apparatus of claim 20 wherein the dynamic group call logic is further arranged to authenticate the user system before the user system is added to the dynamic group call.

23. The apparatus of claim 20 wherein the dynamic group call logic is further arranged to identify a direct connect number in the call alert, the direct connect number being associated with the user system, and wherein the dynamic group call logic arranged to automatically add the user system to the dynamic group call is arranged to add the direct connect number to the dynamic group call.

24. The method of claim 1 wherein detecting the call alert includes detecting the call alert while the dynamic group call is in progress, and wherein automatically adding the user system to the dynamic group call includes automatically adding the user system to the dynamic group call while the dynamic group call is in progress.

* * * * *